United States Patent [19]

Goudy, Jr. et al.

[11] Patent Number: 4,673,527

[45] Date of Patent: Jun. 16, 1987

[54] TABLET GRANULATION

[75] Inventors: Paul R. Goudy, Jr., Bayside, Wis.; Linn W. Cassedy, Roselle; Thomas S. Whitaker, Bartlett, both of Ill.

[73] Assignee: Autotrol Corporation, Milwaukee, Wis.

[21] Appl. No.: 735,845

[22] Filed: May 20, 1985

[51] Int. Cl.$^4$ ............................................. C02F 5/10
[52] U.S. Cl. .................................... 252/181; 252/134; 252/174; 252/175; 252/176; 424/487; 424/469
[58] Field of Search ............... 252/134, 174, 175, 176, 252/181; 424/14

[56] References Cited

U.S. PATENT DOCUMENTS

| | | | |
|---|---|---|---|
| 2,953,497 | 9/1960 | Press | 424/20 |
| 3,039,933 | 6/1962 | Goldman | 424/22 |
| 3,044,938 | 7/1962 | Halley | 424/19 |
| 3,062,720 | 11/1962 | Costello | 424/22 |
| 3,065,143 | 11/1962 | Christenson et al. | 424/19 |
| 3,108,046 | 10/1963 | Harbit | 424/38 |
| 3,133,863 | 5/1964 | Tansey | 424/35 |
| 3,147,187 | 9/1964 | Playfair | 424/35 |
| 3,148,123 | 9/1964 | Werner | 424/32 |
| 3,148,124 | 9/1964 | Gaunt | 424/22 |
| 3,362,880 | 1/1968 | Jeffries | 424/22 |
| 3,362,881 | 1/1968 | Eberhardt et al. | 424/20 |
| 3,388,041 | 6/1968 | Gans | 424/20 |
| 3,629,393 | 12/1971 | Nakamoto et al. | 424/22 |
| 3,632,739 | 1/1972 | Kornblum | 424/19 |
| 3,641,237 | 2/1972 | Gould et al. | 424/16 |
| 3,689,634 | 9/1972 | Kliment et al. | 424/21 |
| 3,773,920 | 11/1973 | Nakamoto et al. | 424/20 |
| 3,816,333 | 6/1974 | King et al. | 252/181 |
| 3,860,526 | 1/1975 | Corbett | 252/181 |
| 3,891,568 | 6/1975 | Nisho et al. | 252/180 |
| 4,039,653 | 8/1977 | DeFoney et al. | 424/19 |
| 4,138,353 | 2/1979 | Lipinski | 252/181 |
| 4,217,216 | 8/1980 | Lipinski | 210/700 |
| 4,246,030 | 1/1981 | Lipinski | 106/14.12 |
| 4,252,786 | 2/1981 | Weiss et al. | 424/19 |
| 4,277,359 | 7/1981 | Lipinski | 252/181 |
| 4,308,251 | 12/1981 | Dunn et al. | 424/19 |
| 4,309,405 | 1/1982 | Guley et al. | 424/21 |
| 4,375,468 | 3/1983 | Dunn | 424/230 |

FOREIGN PATENT DOCUMENTS

| | | |
|---|---|---|
| 758264 | 4/1971 | Belgium . |
| 2207633 | 8/1973 | Fed. Rep. of Germany . |
| 2645547 | 4/1977 | Fed. Rep. of Germany . |
| 9960 | 6/1975 | Hungary . |
| 7483681 | 8/1974 | Japan . |
| 6614357 | 4/1967 | Netherlands . |
| 837451 | 6/1960 | United Kingdom . |
| 1002211 | 8/1965 | United Kingdom . |
| 1005329 | 9/1965 | United Kingdom . |
| 1124115 | 8/1968 | United Kingdom . |
| 1276089 | 6/1972 | United Kingdom . |

Primary Examiner—Robert A. Wax
Attorney, Agent, or Firm—Quarles & Brady

[57] ABSTRACT

An improved granulation and tablet product for water treatment. One or more water treating agents are dispersed and entrapped in a water soluble polymeric material which is more water soluble than the water treating agent. The water treating agent is entrapped in a polymeric matrix by first treating the polymeric material with an alcohol, blending with the water treating agent and subsequently adding water to the admixed polymeric material and water treating agent.

12 Claims, No Drawings

TABLET GRANULATION

This invention relates to an improved granulation and tablet product as well as a method of formulating. More particularly this invention relates to a tablet for treating water wherein a water soluble polymeric material acts as a dispersant and matrix for a water treating agent which is entrapped in a matrix formed by the specially treated polymeric material.

The combination of polyacrylic acid or salt thereof with water treating compounds such as amino phosphonic acids, triazoles and metal molybdates for water treatment to prevent the deposition of scale is well known. U.S. Pat. Nos. 4,138,353; 4,217,216; 4,246,030 and 4,277,359 describe this combination and indicate the use of the polyacrylic acid as a dispensing agent to treat impurities in the water. U.S. Pat. No. 4,277,359 states that the water treating composition for practical considerations will be sold in a fluid or aqueous state having the active components in solution or suspension. The prior art does not provide a teaching of tableting water treating compounds with polymeric materials.

It is known in the drug industry to formulate tablets using ingestible polymeric materials. These materials are employed to protect the active drug from gastrointestinal liquids. U.S. Pat No. 3,689,634 is representative and discloses that drugs can be released gradually to a living organism after oral ingestion, through a layer of non-inogenic, neutral hydrogel of a polymer of ethylene glycol methacrylate or similar monomer crossed-linked sufficiently to make the polymer insoluble in gastrointestinal liquids.

It is also known to formulate tablet compositions containing polymeric materials wherein an alcohol is utilized in the tableting procedure. For example, in Chemical Abstracts Vol. 80, 1972, 12191c reagent tablets are described which were formed with an outer layer material containing sodium chloride, polyvinylpyrolidone and ethanol. Solid oral pharmaceutical compositions of regulated rate of release are described in Chemical Abstracts Vol. 83, 1975, 168490x. Tablets containing the active drug components were prepared by homogenizing a mixture of the active ingredients with a mixture of stearic acid and Tween in 96ethanol and a 2% aqueous solution of sodium carboxymethylcellulose.

The procedure in preparing a granulation composition for a tablet involves one of two general procedures. One is in blending the ingredients with the addition of water. Another is to form a cake of the blended materials and then subsequently grind the cake into the desired particle size. In tablet formulating with polymeric materials using water, the polymer material will tend to become a gelatinous mass and will not blend with the dry powdered active material. There is also a problem in blending materials of the foregoing type wherein the water soluble polymeric material is very hygroscopic and tends to absorb moisture from the air thus making it difficult to blend with the dry active composition or compositions.

Quite unexpectedly it has been found that if the water soluble polymeric material is protected from water prior to blending with the water treating agent and water is later blended with the protected polymeric material and the water treating agent, that a granulation and, after pressing, a tablet results having a high degree of dissolution in water. This resulting granulation or tablet is particularly useful in treating scale formation and in inhibiting corrosion in water such as cooling tower water for air-conditioning purposes.

It is an advantage of the present invention to provide a water treating composition in the form of a tablet or granulation wherein a water soluble polymeric material acts as a matrix for a dry and less soluble water treating material. Another advantage of this invention is to provide a composition of the foregoing type wherein the dry and less soluble water treating material which is normally difficult to blend with the polymeric material is easily blended therewith. Still another advantage of this invention is to provide a novel method for granulating and tableting a water soluble polymeric material with a dry water treating material. Yet another advantage of this invention is to provide a water soluble matrix for a water treating material which matrix will afford a rapid dispersing of the water treating agent. Other advantages are a granulation and tableting product as well as a method of the foregoing type which is readily adaptable to current tablet formulating methods and techniques.

The foregoing advantages are accomplished by the present water treating composition and method of preparation wherein a tablet or granulation is prepared with a water soluble polymeric material in a granular form. The polymeric material is initially treated with an alcohol substantially free of water to blanket the granular resin from moisture and air prior to mixing with dry water treating compound. The water treating compound is blended with blanketed polymeric material and the admixed are blended with water. This treating with water effects a binding of the polymer molecules together and entraps the active compound within a polymeric matrix. A granulation results which also retains less air in the tableting process. A tablet can be prepared from the granulation which rapidly disperses in water.

A particularly suitable water soluble polymeric material is a polyacrylate and preferably the sodium salt thereof. A resin of this type is commercially available as Goodrite 759 or Cyanmer P35. The water soluble polymeric material will be one that will expand upon contact with water. This means that it will have a high affinity for water. The process of this invention solves the problem of combining low water soluble active materials with this type of resin and will be useful with any polymeric material having these characteristics such as the acrylic polymers including polyacrylate polymers and copolymers such as polymethacrylate, polyacrylamide, polyacrylic-coacrylamide and methylacrylamide; vinyl resins including polyvinyl acetate, polyvinyl alcohol and polyvinyl methylether as well as oxides of polyethylene and polypropylene, and polyoxy-methylene. The polymeric material can be used in the base form or as a cationic or anionic salt.

One of the water treating agents to be combined with the water soluble polymeric material is a hexamethylenediamine-tetramethylenephosphonic acid compound which is commonly known in the water treating field as Phosphonate. It is commercially available as Dequest 2051. This constituent is used to disrupt crystal formation and thus it inhibits calcium carbonate and magnesium hydroxide scale formation. It also is effective as a weak corrosion inhibitor. Another corrosion inhibitor is benzotriazole or polytriazole. It is sold under the trade name Cobratec.

Sodium molybdate is utilized synergistically with the Cobratec material as a corrosion inhibitor. However it is not as water soluble as the polymeic material or the previously referred to corrosion inhibitors. Other molybdenum compounds which can be advantageously utilized in the granulation and tablet of this invention is the phosphate. If desired, salts of rare earth elements could also be utilized which would have limited solubility in water.

Other chemical compositions which can be employed with the polymeric matrix are water treating biocides as represented by quaternary ammonium compounds or trisodium phosphate which when combined with the matrix can be used in an aqueous solution to treat boiler scale.

Granulating processing aids can also be used. These would include anti-foaming agents such as condensates of ethylene oxide. This material has hydrophobic bases, is a surfactant and reduces foaming by altering the surface tension of cooling water employed for cooling purposes. A flow enhancer such as fumed silica is available commercially as Cab-o-sil. It is utilized to aid in the dry mixing process prior to tableting. Additionally, a polyethylene glycol available commercially as PEG. 8000 is employed. This material melts at 140° F. or liquefies under shear. It is used as a die lubricant in the tableting process. It has the additional property of a bonding agent with the other powders during tableting.

The preferred alcohol for blanketing the water soluble polymeric material from moisture prior to admixing with the water treating agent is isopropyl alcohol. It also aids in displacing air from the polymer chain prior to admixing. Other low carbon chain alcohols containing from one to five carbon atoms could be advantageously employed.

Water acts as a binding agent for the water treating agents in affixing them to the polymeric material. It also binds the polymer molecules together and traps the additive agents within the polymeric matrix thus forming a granule.

In order to illustrate the granulation and tablet product of this invention, the following Example is set forth. It is not intended to limit the invention in any way.

EXAMPLE

| Ingredients | % by Wt. |
| --- | --- |
| Sodium polyacrylate | 27.675 |
| Hexamethylenediamine-tetramethylenephosphonic acid | 40.500 |
| Benzotriazole | 6.300 |
| Sodium molybdate | 13.500 |
| Ethylene oxide condensation product | .900 |
| Fumed silica | .225 |
| Polyethylene glycol | .900 |
| Isopropyl alcohol | 3.000 |
| Water | 7.000 |
| | 100.000 |

The sodium polyacrylate polymer is in a dry powder form. It will be placed in a folding type mixer such as a Hobart mixer. The isopropyl alcohol is gradually added with mixing until the alcohol and polymer are blended. This procedure is effected in about 1-2 minutes. The admixture will have the appearance of wet sand. In a similar manner the phosphonic acid, benzotriazole and sodium molybdate are added individually. After the addition of the sodium molybdate, the ethylene oxide condensation product, fumed silica and polyethylene glycol are added with mixing. The water was subsequently added which acts as an adhesive to form a polymeric matrix for the phosphonic acid, the benzotriazole and the sodium molybdate. Because of the shearing action of the mixer on the polyacrylate polymer and the addition of the water, the water will effect a binding of the polymer molecules together to form the polymeric matrix.

The total weight of all the previously indicated ingredients was 10 lbs. This granulation product was formed into 10,000 tablets using a standard punch and die tableting machine.

The alcohol treated polymer will have a consistency that is formable with slight compression and the dry ingredients as they are sequentially added will tend to form a layer over the polymer as well as the ingredients forming layers over each other. This is accomplished by the resin surrounding the various layers as they are admixed.

The reasons for the improved disintegration properties of the tablet formulation of this invention with the more readily soluble matrix are the following. One resides in the fact that the polymeric material acts as a dispersing agent for the less readily dissolvable water treating agent so that the polymeric matrix material will dissolve away from the tablet or granulation in an aqueous medium and thereby expose the water treatment material while delaying or controlling supersaturation of the lower soluble material in a given solution site. Neither does the tablet or granulation form of this invention rely on gas formation upon dissolution. Bubble formation causes electrostatic attachment of the less soluble material causing it to move in one direction and upwardly into a stratified layer. In contrast, as the more soluble polymeric material is dissolved from the tablet or granulation eddy currents are produced in a random manner from the tablet or granulation surface and from the backside of the less soluble material thus propelling the less soluble material in a random direction away from the tablet or granulation and in effect simulating a mechanical mixing. It should also be appreciated that as the more water soluble polymeric matrix material is in a compact form, it has a low surface to volume ratio thus being controllably exposed to the solvent action of the water.

An additional factor for improved disintegration is the use of a tablet form for the polymeric material. As portions of the polymer dissolve into solution they will not tend to surround other portions of the polymeric material because of their size in the tablet. This is a commonly occurring phenomenon in dealing with plastics when attempting to place them in solution and is known as the creation of "fish eyes." This is overcome by the use of the tablet form.

We claim:

1. A process for formulating a granulation composition comprising:
    treating a polymeric material with an alcohol which is substantially free of water to blanket said polymeric material from moisture and air;
    admixing said alcohol treated polymeric material with a dry ingredient different from said polymeric material, said dry ingredient being less water soluble than said polymeric material; and
    combining said admixed product with water to bond the polymeric molecules of said polymeric material together and entrap said ingredient in a polymeric matrix.

2. The process of claim 1 wherein additional dry ingredients are added to said dry ingredient in a sequential manner.

3. The process of claim 2 further including the step of forming the granulation into a tablet.

4. A granulation or tablet product wherein a dry ingredient is entrapped in a polymeric material, the dry ingredient being different from the polymeric material and being less water soluble, said product produced by the steps comprising:
   treating said polymeric material with an alcohol which is substantially free of water to blanket said polymeric material from moisture and air;
   admixing said alcohol treated polymeric material with said dry ingredient; and
   combining said admixed product with water to bond the polymeric molecules of said polymeric material together and entrap said ingredient in a polymeric matrix;
   said dry ingredient being entrapped by said polymeric material in a homogenous manner with the polymer chains and the charge sites of said polymers being separated by said alcohol and water treatment steps prior to said entrapment.

5. The product of claim 4 wherein said alcohol contains from one to five carbon atoms.

6. The product of claim 4 wherein said polymeric material is an acrylic polymer.

7. The product of claim 4 wherein said polymeric material is a vinyl resin.

8. The product of claim 4 wherein said polymeric material is an oxide of polyethylene, polypropylene or polyoxymethylene.

9. The product of claim 4 wherein said dry ingredient is a water treating agent.

10. The product of claim 9 wherein said water treating agent includes a phosphonic acid compound.

11. The water treating composition of claim 9 wherein said water treating agent includes a molybdate compound.

12. The product of claim 9 wherein said water treating agent includes a benzotriazole compound.

* * * * *

UNITED STATES PATENT AND TRADEMARK OFFICE
CERTIFICATE OF CORRECTION

PATENT NO. : 4,673,527
DATED : June 16, 1987
INVENTOR(S) : Goudy, Jr. et al.

It is certified that error appears in the above-identified patent and that said Letters Patent is hereby corrected as shown below:

| | |
|---|---|
| Column 1, line 3, | "Background of the Invention" is missing |
| Column 1, line 17, | "dispensing" should read --dispersing-- |
| Column 1, line 45, | "96ethanol" should read --96% ethanol-- |
| Column 2, line 29, | after "with" --a-- should appear |
| Column 2, line 31, | after "with" --the--should appear |
| Column 2, line 32, | after "admixed" --materials-- should appear |
| Column 6, line 17, | delete "water treating composition" and insert --product-- |

Signed and Sealed this

Second Day of February, 1988

Attest:

DONALD J. QUIGG

*Attesting Officer*  *Commissioner of Patents and Trademarks*